United States Patent [19]

Hammond

[11] 4,438,527
[45] Mar. 20, 1984

[54] SIGNAL RESPONSIVE AUTOMATIC CONTROL FOR AUDIO EQUIPMENT

[76] Inventor: William P. Hammond, 7472 Delmar, St. Louis, Mo. 63130

[21] Appl. No.: 365,084

[22] Filed: Apr. 2, 1982

[51] Int. Cl.³ .................... H04M 11/00; H03G 3/20
[52] U.S. Cl. ........................ 381/107; 179/2 B
[58] Field of Search .............. 179/2 B, 2 A, 2 AM, 179/1 VL; 455/234, 235, 249, 221, 212, 194, 174, 88; 381/104–109

[56] References Cited

U.S. PATENT DOCUMENTS 3,300,584  1/1967  Jeanlin .................... 179/1 VL
3,446,976  5/1969  Shaw ...................... 179/2 B X

OTHER PUBLICATIONS

*Radio and Electronics Constructor*, vol. 34, No. 4, Dec. 1980, pp. 224–230, R. Penfold, "Opto Coupled Volume Expander".

*Primary Examiner*—G. Z. Rubinson
*Assistant Examiner*—W. J. Brady
*Attorney, Agent, or Firm*—Polster, Polster and Lucchesi

[57] ABSTRACT

A remote volume control apparatus for audio equipment is operated by the ringing of a telephone to slowly decrease the volume of an audio amplifier during the control's initial operation, maintain the volume at a preselected low volume and slowly increase the volume automatically after the termination of the telephone conversation. In the preferred embodiment, a circuit active indicator also is provided for indicating both proper apparatus operation an activation of the telephone signal. An attenuation level control also is provided in the form of a switch selector operable to enable the user to preselect a desired attenuation level.

13 Claims, 4 Drawing Figures

U.S. Patent  Mar. 20, 1984  4,438,527
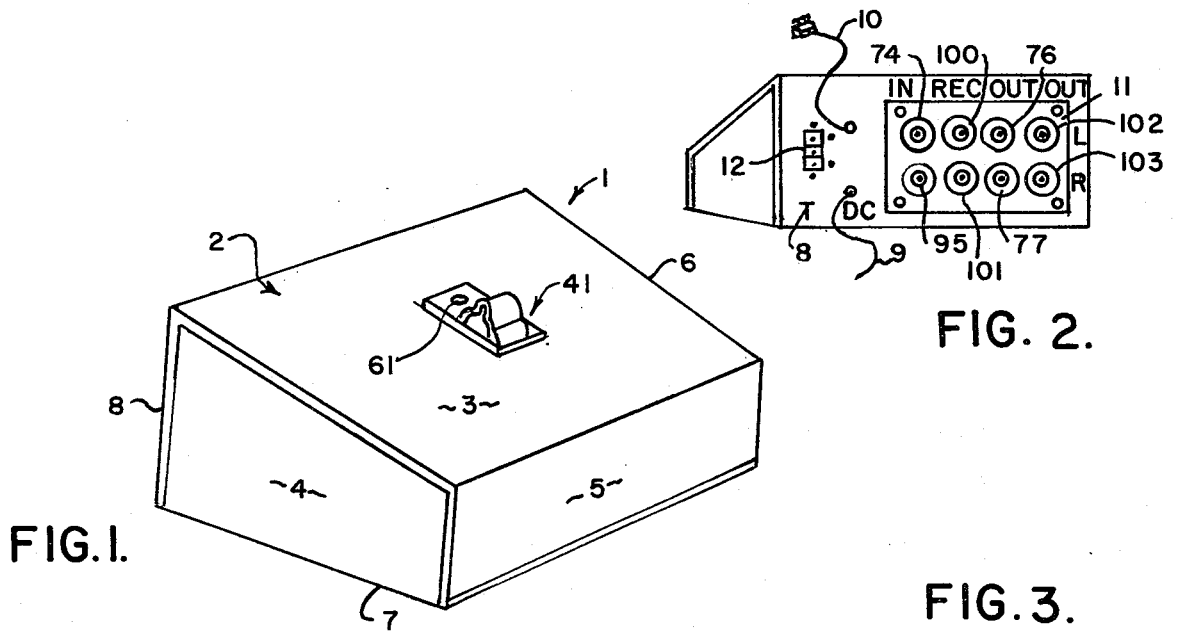
FIG. 2.
FIG. 1.
FIG. 3.
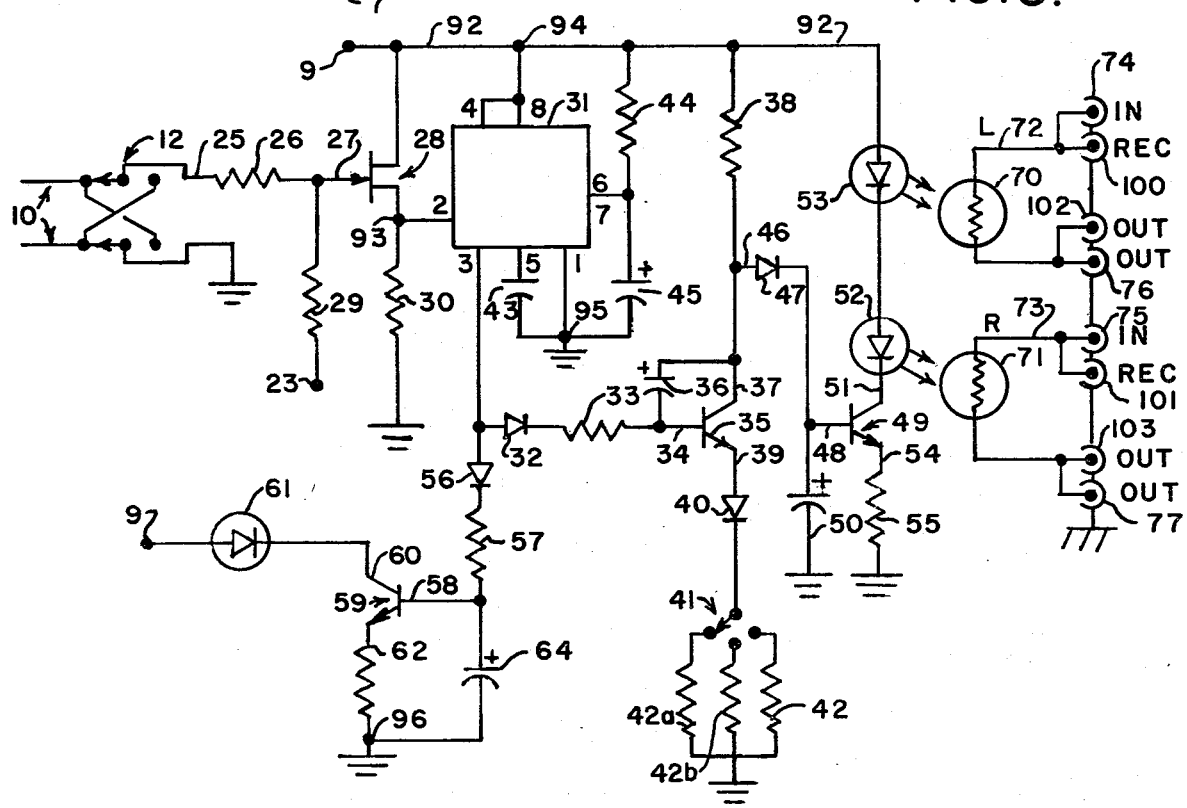
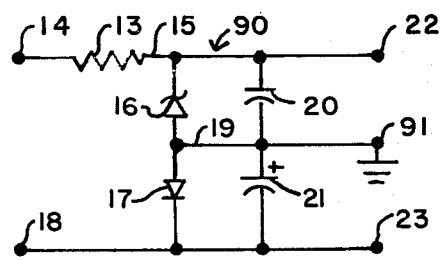
FIG. 4.

SIGNAL RESPONSIVE AUTOMATIC CONTROL FOR AUDIO EQUIPMENT

BACKGROUND OF THE INVENTION

This invention relates to an electronic control circuit for controlling the operation of an audio amplifier, and more particularly, to a muting device utilized in conjunction with a telephone for controlling the operation of an audio amplifier. The circuit is activated automatically in response to the condition of the telephone line. While the invention is described with respect to such muting function, those skilled in the art will recognize the wider applicability of the inventive principles discussed hereinafter.

A number of devices for controlling radios or audio amplifiers, or for muting an audio amplifier are known in the art. Among the patents of which I am aware are Van Velsor, U.S. Pat. No. 2,498,349, issued Feb. 21, 1950, Butler, U.S. Pat. No. 2,503,095, issued Apr. 4, 1950, Hof, U.S. Pat. No. 2,792,450, issued May 14, 1957, Bloxsom, U.S. Pat. No. 3,267,379, issued Aug. 16, 1966, Ruthenberg, U.S. Pat. No. 3,328,695, issued June 27, 1967, Shaw, U.S. Pat. No. 3,446,976, issued May 27, 1969, and Ellis, U.S. Pat. No. 3,532,823, issued Oct. 6, 1970. In general, this body of prior art operates to automatically disconnect or connect a radio or similar audio device upon either the ringing of a telephone or the picking up of a handset for a telephone. That is the type of system disclosed in Van Velsor, Butler, Hof, and Ellis. Bloxsom discloses a device for the user of a mobile telephone to selectively use the telephone radio circuitry to control external equipment by dialing or otherwise manipulating a telephone apparatus. Ruthenberg is a transmitter/receiver unit in which the receiver output is muted during transmission. Shaw discloses an amplifier muting circuit based on telephone operation, but requires manual resetting of the audio amplifier after each use.

While this body of prior art has attempted to solve or provide a useful product for an intended purpose, the devices disclosed have not provided commercially successful because they are deficient in a number of respects. The devices generally are designed to permit controlled operation of a sound source, generally a "radio", during a telephone conversation. It is extremely convenient to permit a user to listen to an audio source at some desired level, and to mute that source when desired, as for example, when conducting a telephone conversation. As audio or "stereo" equipment has become more sophisticated, known devices have not functioned well when interconnected with those systems. Audiophiles spend relatively large sums of money in order to obtain pure, realistic sound reproduction. To my knowledge, devices prior to my invention either could damage operation of the audio equipment or cause distortion when interconnected with that equipment.

The invention disclosed hereinafter provides a compact, relatively low cost device which is designed for interconnection between a phone line and an audio amplifier to provide automatic muting of the audio circuit without distortion, and to permit return of the audio circuit to normal operation upon termination of phone usage.

One of the objects of this invention is to provide an improved audio muting circuit.

Another object of this invention is to provide a muting circuit which is compatible with a wide variety of audio amplifiers and phone circuits.

Still another object of this invention is to provide a muting circuit for audio amplifiers and phone circuits which is connectable to such circuits without requiring modification to those circuits.

Another object of this invention is to provide a low cost muting circuit design.

Another object of this invention is to provide a muting circuit design in which the only circuit components which are inserted in the audio path are resistive, so that no distortion of noise is introduced in the audio path.

Other objects of this invention will be apparent to those skilled in the art in light of the following description and accompanying drawings.

SUMMARY OF THE INVENTION

In accordance with this invention, generally stated, a muting device for audio equipment is provided which mutes the output of an audio amplifier, for example, upon the occurrence of a sensed event, and automatically returns the audio output to its original level upon termination of the sensed event. In the preferred embodiment, muting is accomplished evenly and predictably, without annoying and dangerous voltage or current spikes. The muting control circuit is optically coupled to the audio circuit, so that no distortion or noise is introduced into the audio path. This is accomplished by controlling the operation of photodiodes (LDR). The photodiodes conduct during normal operation so that their receptive resistors, inserted in the audio path, exhibit a relatively low impedance. Upon reception of an incoming telephone call, current flow through the photodiodes (LDR) controllably diminishes to a predetermined reduced value, and their receptive resistors approach an extremely high impedence value.

BRIEF DESCRIPTION OF THE DRAWINGS

In the drawings, FIG. 1 is a view in perspective of one illustrative embodiment of muting device of this invention;

FIG. 2 is a view in perspective of a rear side of the device shown in FIG. 1; 1

FIG. 3 is a electrical schematic diagram of an illustrative circuit employed in the muting device of FIG. 1; and FIG. 4 is a diagrammatic view of a power supply utilized with the circuit of FIG. 3.

DESCRIPTION OF THE PREFERRED EMBODIMENTS

Referring now to FIG. 1, reference numeral 1 indicates one illustrative embodiment of muting device of this invention. The device 1 preferably is housed in an enclosure 2 having a front face 3, sides 4, 5 and 6, a bottom 7 and a back 8. The back 8 has an exposed a terminal board 11 mounted to it. The back 8 and terminal board 11 are employed to interconnect a source of power at an input 9, for interconnecting the device 1 to a phone line at an input 10, and for connecting the device 1 to the audio equipment which it is intended to mute. A line polarity switch 12 also is positioned on the back 8. The purpose of the switch 12 is described in greater detail hereinafter.

Power for the device 1 is provided by a power supply 90, one illustrative embodiment of which is shown in FIG. 4. The circuit of FIG. 4 is designed to operate from a conventional 110 volt power line input voltage supply and includes a resistor 13 connected to one side of the power supply at an input terminal 14. An second side 15 of the resistor 13 is connected to the cathode side of a zener diode 16, while the anode of the zener diode 16 is connected to the anode side of a diode 17. The cathode of the diode 17 is connected to the power source at a second input terminal 18. The anodes of the diodes 16 and 17 are connected to ground along a conductor 19, and a pair of capacitors 20 and 21 are connected between ground and an output terminal 22 and an output terminal 23, respectively. The diode-capacitor circuit performs a voltage division so that a d.c. output voltage of approximately 13 volts occurs between output terminal 22 and a terminal 91, while a d.c. output voltage of approximately a negative 0.6 volt occurs between terminal 91 and output terminal 23. The power supply 90 preferably is provided remotely of the device 1, although it can be included within the enclosure 2, if desired. When provided remotely, the voltages required are supplied to the device 1 along the input 9.

As indicated above, the phone line is connected to the device 1 along the input 10, and a telephone polarity switch 12 is arranged so that a positive input of the phone line is connected to a first side 25 of a resistor 26. A second output side of resistor 26 is connected to a gate electrode 27 of a field effect transistor 28. The gate 27 also is connected to the negative 0.6 volt voltage input terminal 23 through a resistor 29. The 13 volt power input also is provided along the input 9 and a conductor 92. The transistor 28 has its source electrode electrically connected to the conductor 92, while its drain electrode is connected to ground through a resistor 30.

A solid state timer 31 has a pin 2 connected to the drain electrode of the transistor 28 at a connection point 93, while the pins 4 and 8 of timer 31 are connected to the conductor 92 at a connection point 94. An output pin 3 of timer 31 is connected to a diode 32. The cathode of the diode 32 is connected through a resistor 33 to the base 34 of a NPN transistor 35. A capacitor 36 is connected between a collector 37 of the transistor 35 and the base 34 thereof. The collector 37 is connected to the 13 volt power supply provided along the conductor 92 through a resistor 38.

An emitter 39 of the transistor 35 is connected to ground through a diode 40 and an attenuation selection switch 41. Attenuation selection switch 41 is shown on the front face 3 of the enclosure 2 in FIG. 1, and is adapted to connect the emitter 39 to one of a plurality of resistors 42a, 42b and 42c. That connnection varies the impedance of the emitter circuit to ground in FIG. 3.

Pin 5 of the timer 31 is connected through a capacitor 43 to pin 1 and to ground at a connection point 95. Pins 6 and 7 of the timer 31 are connected to the conductor 92 through a resistor 44 and to the connection point 95 through a capacitor 45.

Collector 37 of transistor 35 also is connected to an anode side 46 of a diode 47, the cathode side of diode 46 being connected to a base 48 of a transistor 49. Base 48 of transistor 49 is connected to ground through a capacitor 50. A collector 51 of transistor 49 is connected to a pair of photodiodes 52 and 53 which are in turn arranged in series with one another. The anode of diode 53 is connected to the input 9 along the conductor 92.

An emitter 54 of the transistor 49 is connected to ground through a resistor 55.

Pin 3 of timer 31 also is connected through a diode 56 and a resistor 57 to the base 58 of a transistor 59. A collector 60 of transistor 59 is connected to the 13 volt input source voltage at 9 through a light emitting diode 61, which is mounted in the front face 3 of the enclosure 2. An emitter 62 of transistor 59 is connected to ground through a resistor 63. A capacitor 64 is connected to one side of the resistor 63 at a point 96 and to the base 58 of the transistor 59.

The diodes 52 and 53 are optically coupled to light responsive resistors 70 and 71, which are electrically connected in an output channel 72 and and an output channel 73, respectively. The channels 72 and 73 are intended to correspond to first and second channels of an audio amplifier, not shown, for example, the left and right tape outputs of which are connected to the respective input terminals 74 and 75 of the terminal board 11. In use, the left and right tape outputs of the audio amplifier form an input along terminals 74 and 75, shown in FIGS. 2 and 4. The audio signal passes through the resistors 70 and 71 in the respective channels and forms an output at the pair of terminals 76 and 77, respectively. This effectively couples the resistors 70 and 71 into the output circuit of the audio amplifier. The power amplifier (not shown) of any audio system then is connected to the terminals 76 and 77 in a conventional manner. A pair of terminals 100 and 101 also are provided on the terminal board 11. The terminals 100 and 101 are used in conjunction with an audio recorder, not shown. That is to say, the inputs for a tape or cassette recorder, for example, may be connected to the terminals 100 and 101 in a conventional manner. Thereafter, recordings of the audio signal may be made without interruptions, even when the device 1 operates to mute the speaker signal at the terminals 76 and 77. A pair of terminals 102 and 103, respectively, are provided for the attachment of additional amplifiers, if desired.

Operation of the device 1 is relatively simple. Under normal handset hook conditions for a telephone or the like, the phone line voltage is approximately 40 to 50 volts. In this condition, a voltage across resistors 26 and 29 gates transistor 28 into conduction. Conduction of the transistor 28 holds the output of the timer 31 low. With the output of timer 31 being held low, no positive bias is provided to the base of transistor 35, and consequently, transistor 49 is in a conductive state. Current flow through the diodes 52 and 53 causes their optically coupled resistors 70 and 71 to be at a minimum resistance. Consequently, the audio output of a interconnected amplifier and speaker set will operate normally.

When the telephone rings or the handset is removed from its cradle, the phone line voltage falls to approximately 15 volts. This is insufficient to maintain conduction of the transistor 28, and consequently, the timer 31 switches state. Upon a switch of state, a bias voltage appears across the resistor 33, biasing the transistor 35 into conduction. Conduction by the transistor 35 removes base drive from the transistor 49. However, the charge on capacitor 50 will slowly bleed through transistor 49 and resistor 55, to allow a slow reduction of the flow current through diodes 52 and 53. This slow reduction of current through the diodes 52 and 53 causes the resistance of their corresponding optically coupled resistors 70 and 71 to increase gradually to a very high value. This of course mutes the audio signal to the audio amplifier, which sees approximately an open circuit at its input side.

Simultaneously with the gradual muting of the audio sound, current flow through resistor 57 provides base drive for the transistor 59, causing that transistor to conduct. Conduction of the transistor 59 permits current flow through the light emitting diode 61 causing that light emitting diode to visually indicate the activity of the phone mute, which may be observed on the front face 3 of the enclosure 2.

When the phone stops ringing or the handset is returned to its cradle, the voltage across resistor 26 again increases sufficiently to permit it to gate the transistor 28 into conduction. Conduction by the transistor 28 causes the timer 31 to reverse state. That reversal again removes base drive from the transistor 35. Base drive is not removed from the transistor 35 immediately, however, because the relative large capacitor 36 connected between its collector and base discharges slowly through the transistor 35. That discharge in turn permits the transistor 49 to turn on slowly, gradually increasing conduction of the diodes 52 and 53 and reducing the resistance of the optically coupled resistors 70 and 71. Consequently, the audio output to connected speakers slowly increases back to the preselected level.

The change of state of the timer 31 reduces base drive to the transistor 59, causing that transistor to revert to its nonconduction state, and extinguishing the light emitting diode 61.

The attenuation provided by the transistor 35 can be varied by the attenuation selection switch 41 which selectively inserts the resistors 42a, 42b and 42c in the emitter circuit of the transistor 35. Insertion of the resistors in this circuit will vary the base drive to the transistor 49, and permit control of the attenuation provided by the optically coupled resistors 70 and 74.

Numerous variations, within the scope of the appended claims, will be apparent to those skilled in the art in light of the foregoing description and accompanying drawings. Thus, various circuit modifications may be made to the circuit without departing from the concept of this invention. Additional circuitry to that described may be provided. For example, the attenuation selection switch may be replaced by a constantly adjustable resistor for varying the amount of attenuation provided. Although certain elements are described as preferred, other components may be substituted, if desired. A number of electrical configurations can be envisioned for accomplishing the end result of my invention, once enlightened by the drawings and description set out hereinabove. While a preferred audio component scheme is described, the components may be connected in other ways to accomplish a similar result. These variations are merely illustrative.

Having thus described the invention, what is claimed and desired to be secured by Letters Patent is:

1. A device for automatically muting an audio signal, comprising:
   means for providing an electrical signal having at least first and second voltage levels;
   means for sensing said first and said second voltage signal levels;
   means operatively connectable to an audio amplifier for providing distortion free attenuation control of the audio output of said amplifier;
   means operatively connected to said first and second voltage sensing means for predeterminedly operating said control means, said operating means automatically providing at least first and second attenuation control voltage signal levels in response respectively to said first and second voltage signals levels; and
   means for adjusting at least one of said first and second attenuation control voltage signal levels operatively connected to said predeterminedly operating means.

2. The device of claim 1 wherein said distortion free control means comprises at least one electromagnetic wave energy sensitive element operatively connectable to an audio amplifier and an electromagnetic wave generating means operatively connected to said sensing means and optically connected to said predeterminedly operating means.

3. The device of claim 2 further including means for visually signalling to an observer operation of said device connected to said sensing means.

4. The device of claim 3 wherein said electromagnetic wave energy emitting device comprises a photodiode, further including a switch means connected to said photodiode to control conduction thereof, and means for controlling the "on" and "off" conditions of said switch so as to provide a gradual change between "off" and "on" conditions.

5. A device for automatically muting an audio signal, comprising:
   means for sensing the presence of an electrical signal having at least first and second voltage levels;
   means responsive to said sensed electrical signal for providing at least one control electrical signal;
   means for controlling the output of an audio amplifier;
   means operatively connected between said sensed signal responsive means and said controlling means for operating the controlling means in response to said control electrical signal, said operating means automatically providing at least first and second attenuation control levels in response respectively to said first and second voltage signal levels.

6. The device of claim 5 wherein said controlling means comprises at least one electromagnetic wave energy sensitive element connectable to said audio amplifier and an electromagnetic wave generating means connected to said sensed electrical signal responsive means and optically connected to said controlling means.

7. The device of claim 6 wherein said controlling means includes means for selectively varying the attenuation provided by said muting device.

8. The device of claim 7 further including means for visually signalling operation of said device operatively connected to said sensed electrical signal responsive means.

9. The device of claim 8 wherein said electromagnetic wave generating means comprises a photodiode and said means for varying the attenuation provided by said muting device includes a first switch connected to said photodiode to control conduction thereof, and means for varying the "on" and "off" conditions of said first switch.

10. The device of claim 9 further including a second switch connected to said photodiode and to said first switch, and means connected to said second switch to maintain said second switch in an "on" condition after said first switch is placed in its "off" condition.

11. A device for automatically adjusting an audio signal, comprising:
    means for controlling the output of an audio amplifier including an electromechanical wave energy responsive device automatically operable to vary the impedance in the audio amplifier circuit reciprocally between at least first and second values;

means for operating said controlling means including electromechanical wave energy generating means having an output optically coupled to said electromechanical wave energy responsive device;

means for selectively adjusting the output provided by said operating means;

means for generating a control signal to said operating means including means for sensing the presence of an electrical signal having at least first and second voltage levels, said first and second voltage levels being operatively applied to vary the impedance in the audio amlifier reciprocally between said first and second values; and means responsive to said control signal generating means for visually indicating the operation of said device.

12. The device of claim 11 wherein said electromechanical wave energy generating means comprises a photodiode and said means for adjusting the control provided by said operating means includes a first switch operatively connected to said photodiode to control conduction thereof, and means for adjusting the "on" and "off" conditions of said first switch.

13. The device of claim 12 further including a second switch connected to said photodiode and said first switch and means connected to said second switch to maintain said second switch in an "on" condition after said first switch is placed in an "off" condition.

* * * * *